Feb. 11, 1930.   W. BARTELS   1,746,513
TOOL
Filed Dec. 31, 1928
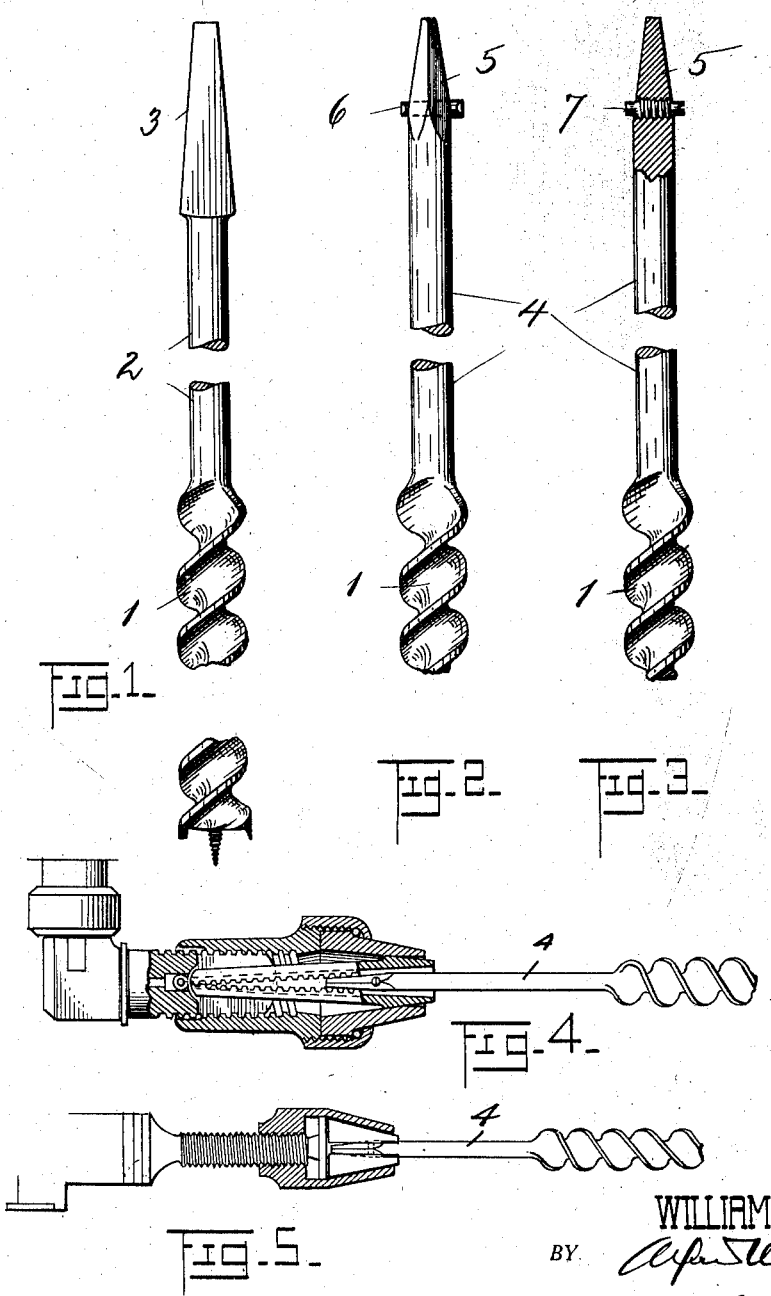
INVENTOR:
WILLIAM BARTELS.
BY
his ATTORNEY.

Patented Feb. 11, 1930

1,746,513

UNITED STATES PATENT OFFICE

WILLIAM BARTELS, OF NEW YORK, N. Y.

TOOL

Application filed December 31, 1928. Serial No. 329,525.

My invention has reference to tools, such as augers, drills, or the like, adapted to be used in a brace or in a mechanically operated machine.

Tools of this kind adapted to be used in a machine, are made with a smooth cylindrical shaft, whereas when used in a brace, the tools have a shaft which terminates in a more or less tapering square head adapted to be engaged by and held in the chuck of the brace. Such a tool can not be used in a machine, and vice versa a tool having a smooth cylindrical shaft can not be used in a brace, which means that all such tools must be duplicated.

Now, the object of the present invention is to provide a tool of that kind which can be used at will either in a brace or in a machine resulting in an obvious saving of tools.

For a fuller understanding of my invention, I refer to the annexed drawing, in which I have shown, by way of illustration, an auger, Fig. 1 showing in fragments the usual type as made for a brace, while Figs. 2 and 3 show in fragments an embodiment of the new auger, Fig. 3 being a slight modification of Fig. 2 and being partly in section. Figure 4 shows the tool as used in a brace chuck. Figure 5 shows the tool as used in a machine chuck.

The old-time auger shown in Fig. 1 comprises the operating portion 1, the cylindrical shaft 2 and the tapering square head 3. While this kind of tool is adapted to be used in a brace, it can not be used in a machine which requires a smooth shaft.

Figs. 2 and 3 show an auger which can be used at will in either a brace, or in a machine. As shown in said two figures, the auger is made with a perfectly smooth shaft 4 tapering toward its end 5 and having four flat faces starting about three-quarters of an inch, more or less, from the point. At the place where the tapering starts, a conical hole is provided in the shaft 4. Such an auger having a smooth cylindrical shaft is adapted to be used in a machine. In order to adapt the same auger to be used in a brace, a conical pin shown at 6 in Fig. 2 is inserted into the conical hole so as to project on opposite sides of the shaft as shown in Fig. 2. These projecting ends of the pin will prevent the shaft when placed into the chuck of a brace from turning therein. The pin 6 being conical can be readily dislodged from its position in the hole of the shaft by a slight tap on the pin, so that the tool, if desired, is instantly adapted for use in a machine.

In the auger shown in Fig. 3, there is provided in the shaft 4, instead of the conical hole shown in Fig. 2, a threaded bore, the female threads of which are adapted to be engaged by the outer threads formed on the central portion of a stud 7, which, as shown, may be provided in one of its ends with a slot for the application of a screw-driver. As in Fig. 2, the ends of the stud project on opposite sides of the shaft thereby constituting means for preventing the turning of the shaft in the chuck of a hand-brace. It will be seen, that the stud can be quickly screwed out of the threaded bore of the shaft, if the auger shall be used in a machine.

While having illustrated and described my invention in detail, I do not, of course, limit myself to this disclosure reserving to myself such variations and other modifications as are within the scope of the invention.

I claim:

1. In a tool comprising an operative portion and a smooth shaft terminating in a flattened tapering square point and having a hole transversely extending through said shaft at the base of the tapering point, and a tapering pin adapted to be received detachably in said hole projecting on opposite sides so that said tool can be used in both brace chucks and machine chucks.

2. An auger comprising a smooth cylindrical shaft terminating in a flattened tapering square point and having a conical bore transversely extending through the shaft at the base of said point, and a conical member adapted to be received in said conical bore projecting on opposite sides therefrom so that said tool can be used in both brace chucks and machine chucks.

In testimony whereof I affix my signature.

WILLIAM BARTELS.